United States Patent
Kray et al.

(10) Patent No.: US 10,612,560 B2
(45) Date of Patent: Apr. 7, 2020

(54) COMPOSITE AIRFOIL WITH FUSE ARCHITECTURE

(71) Applicant: GENERAL ELECTRIC COMPANY, Schenectady, NY (US)

(72) Inventors: Nicholas Joseph Kray, West Chester, OH (US); Kishore Budumuru, Bangalore (IN); Jain Nitesh, Bangalore (IN); Michael Harvey Schneider, Loveland, OH (US)

(73) Assignee: General Electric Company, Schenectady, NY (US)

( * ) Notice: Subject to any disclaimer, the term of this patent is extended or adjusted under 35 U.S.C. 154(b) by 271 days.

(21) Appl. No.: 15/540,653

(22) PCT Filed: Dec. 15, 2015

(86) PCT No.: PCT/US2015/065817
§ 371 (c)(1),
(2) Date: Jun. 29, 2017

(87) PCT Pub. No.: WO2016/114888
PCT Pub. Date: Jul. 21, 2016

(65) Prior Publication Data
US 2017/0370376 A1  Dec. 28, 2017

Related U.S. Application Data

(60) Provisional application No. 62/102,910, filed on Jan. 13, 2015.

(51) Int. Cl.
*F04D 29/38* (2006.01)
*F01D 5/14* (2006.01)
(Continued)

(52) U.S. Cl.
CPC .......... *F04D 29/388* (2013.01); *F01D 5/142* (2013.01); *F01D 5/147* (2013.01); *F01D 5/284* (2013.01);
(Continued)

(58) Field of Classification Search
CPC .... F04D 29/388; F04D 29/325; F04D 29/023; F01D 21/045; F01D 5/284; F01D 5/142;
(Continued)

(56) References Cited

U.S. PATENT DOCUMENTS

| | | | |
|---|---|---|---|
| 4,111,600 A | 9/1978 | Rothman et al. | |
| 5,836,744 A | 11/1998 | Zipps et al. | |

(Continued)

FOREIGN PATENT DOCUMENTS

| | | |
|---|---|---|
| CN | 101178012 A | 5/2008 |
| CN | 102889169 A | 1/2013 |

(Continued)

OTHER PUBLICATIONS

Office Action issued in connection with corresponding CA Application No. 2972764 dated Jun. 11, 2018.
(Continued)

*Primary Examiner* — Xiao En Mo
(74) *Attorney, Agent, or Firm* — Dority & Manning, P.A.

(57) ABSTRACT

An airfoil material loss control structure is provided. This structure includes at least one fuse zone that, during impact from a foreign object, fail before the surrounding structure. In a further aspect, a rotary machine is provided. This rotary machine includes a ducted fan gas turbine engine including a composite airfoil with at least one fuse zone.

18 Claims, 4 Drawing Sheets

(51) Int. Cl.
*F01D 21/04* (2006.01)
*F01D 5/28* (2006.01)
*F04D 29/02* (2006.01)
*F04D 29/32* (2006.01)

(52) U.S. Cl.
CPC .............. *F01D 5/288* (2013.01); *F01D 21/04* (2013.01); *F01D 21/045* (2013.01); *F04D 29/023* (2013.01); *F04D 29/325* (2013.01); *Y02T 50/672* (2013.01); *Y02T 50/673* (2013.01)

(58) Field of Classification Search
CPC .......... F01D 5/288; F01D 21/04; F01D 5/147; Y02T 50/672; Y02T 50/673
See application file for complete search history.

(56) References Cited

U.S. PATENT DOCUMENTS

| | | | |
|---|---|---|---|
| 6,146,099 | A | 11/2000 | Zipps et al. |
| 6,447,248 | B1 | 9/2002 | Kastl et al. |
| 7,780,410 | B2 | 8/2010 | Kray et al. |
| 8,251,640 | B2 | 8/2012 | Beckford et al. |
| 8,393,871 | B2 | 3/2013 | Yarbrough |
| 8,430,623 | B2 | 4/2013 | Beckford et al. |
| 8,459,955 | B2 | 6/2013 | McMillan et al. |
| 8,573,936 | B2 | 11/2013 | Lafont |
| 8,647,072 | B2 | 2/2014 | McMillan |
| 8,720,526 | B1 | 5/2014 | Campbell et al. |
| 8,734,114 | B2 | 5/2014 | McMillan |
| 8,821,119 | B2 | 9/2014 | Beckford et al. |
| 8,828,172 | B2 | 9/2014 | Overgaard |
| 2007/0041842 | A1 | 2/2007 | Thompson et al. |
| 2008/0273983 | A1 | 11/2008 | Clark et al. |
| 2011/0217166 | A1* | 9/2011 | McMillan ............... F01D 5/147 415/229 |

FOREIGN PATENT DOCUMENTS

| | | |
|---|---|---|
| CN | 102990945 A | 3/2013 |
| CN | 103375184 A | 10/2013 |
| DE | 698 17 065 T2 | 4/2004 |
| DE | 10 2012 106 446 A1 | 1/2013 |
| DK | 2012 70444 A | 1/2013 |
| EP | 0 874 136 B1 | 8/2003 |
| EP | 2 159 378 A2 | 3/2010 |
| EP | 2 363 271 A1 | 9/2011 |
| EP | 2 365 186 A2 | 9/2011 |
| EP | 1 985 809 A3 | 1/2012 |
| EP | 2 159 374 A3 | 10/2012 |
| EP | 2 570 254 A1 | 3/2013 |
| FR | 2 942 513 A1 | 8/2010 |
| GB | 2 450 139 A | 12/2008 |
| GB | 2 448 886 B | 6/2009 |
| JP | H11-6499 A | 1/1999 |
| WO | 2014/078305 A1 | 5/2014 |

OTHER PUBLICATIONS

Machine Translation and First Office Action and Search issued in connection with corresponding CN Application No. 201580073356.0 dated Aug. 15, 2018.

International Search Report and Written Opinion issued in connection with corresponding PCT Application No. PCT/US2015/065817 dated Mar. 10, 2016.

International Preliminary Report on Patentability issued in connection with corresponding PCT Application No. PCT/US2015/065817 dated Jul. 18, 2017.

* cited by examiner

COMPOSITE AIRFOIL WITH FUSE ARCHITECTURE

CROSS-REFERENCE TO RELATED APPLICATIONS

The present application claims priority to U.S. Provisional Patent Application Ser. No. 62/102,910 titled "Composite Airfoil with Fuse Architecture", filed on 13 Jan. 2015, and PCT application serial number PCT/US2015/065817, entitled "A COMPOSITE AIRFOIL WITH FUSE ARCHITECTURE", filed 15 Dec. 2015.

STATEMENT REGARDING FEDERALLY SPONSORED RESEARCH

None.

TECHNICAL FIELD

The field of the present disclosure relates generally to rotary machines, and more particularly to airfoils used with rotary machines. The present embodiments relate generally to an airfoil for use in a fan module of an aircraft mounted gas turbine engine. More specifically, present airfoil embodiments relate to, but are not limited to, a composite airfoil which mitigates a variety of adverse environmental effects while rotating at high speeds.

BACKGROUND

At least some known rotary machines, such as gas turbine engines used for aircraft propulsion, include a plurality of rotating airfoils connected to a rotor that are part of a fan module and channel air downstream. These airfoils have certain integrity to foreign object debris ingested by the engine, but the ingestion of foreign objects can still lead to releasing portions of the rotating airfoil which generates undesired rotor unbalance and therefore can be improved.

SUMMARY

In one aspect, a means for controlling airfoil material loss is provided. In another aspect, an airfoil material loss control structure is provided. This structure includes at least one fuse zone that, during impact from a foreign object, fail before the surrounding structure. In a further aspect, a rotary machine is provided. This rotary machine includes a ducted fan gas turbine engine including a composite airfoil with at least one fuse zone.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the structures and methods may be gleaned from the disclosure herein. A more extensive presentation of features, details, utilities, and advantages of the embodiments of the present invention are provided in the following written description of various embodiments of the invention, illustrated in the accompanying drawings, and defined in the appended claims. Therefore, no limiting interpretation of the summary is to be understood without further reading of the entire specification, claims and drawings included herewith.

BRIEF DESCRIPTION OF THE DRAWINGS

The above-mentioned and other features and advantages of these embodiments, and the manner of attaining them, will become more apparent and the embodiments will be better understood by reference to the following description taken in conjunction with the accompanying drawings, wherein.

DETAILED DESCRIPTION

Figure 1:
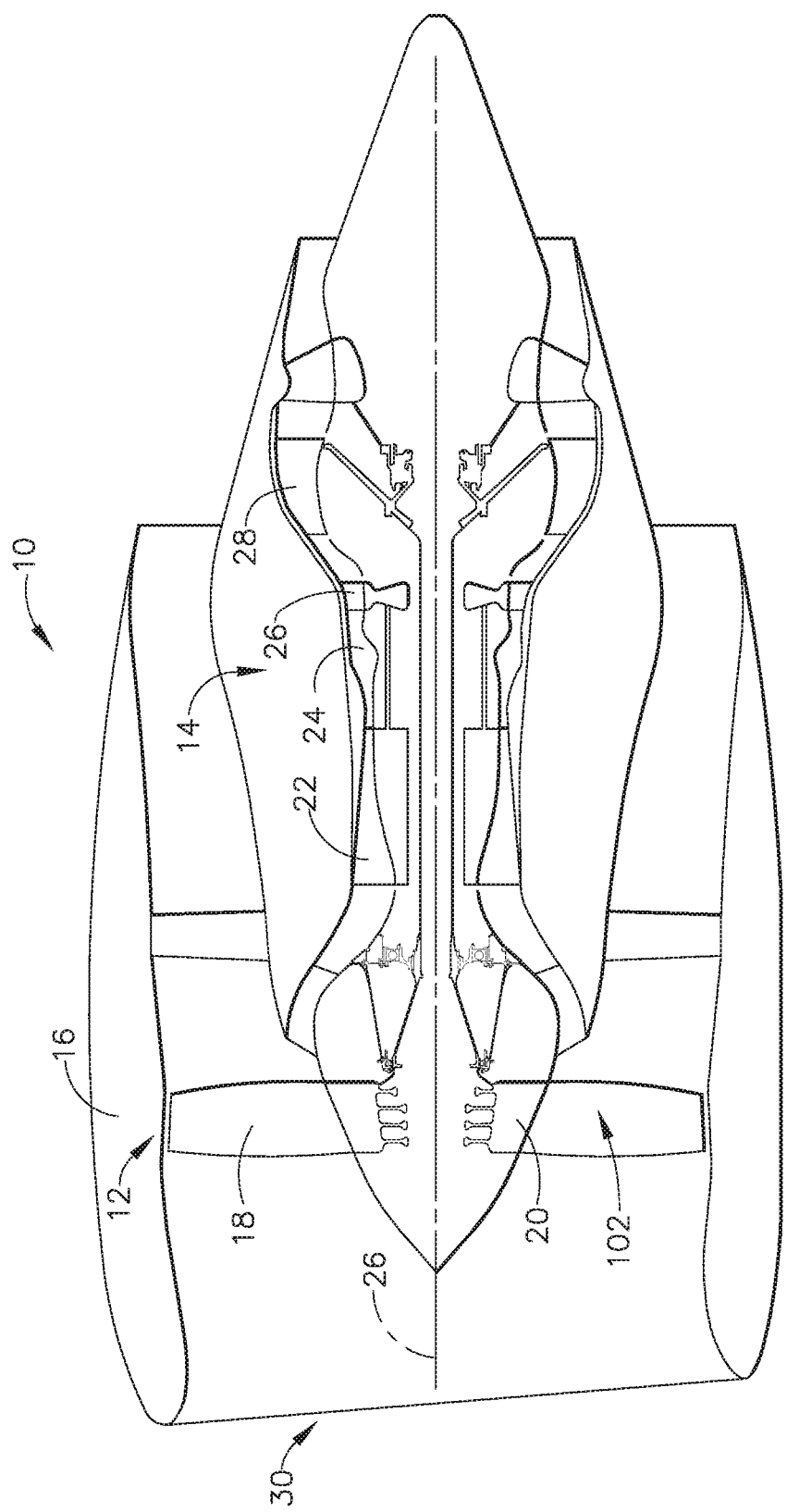
FIG. 1 is a side section view of a ducted fan gas turbine engine.

It is to be understood that the depicted embodiments are not limited in application to the details of construction and the arrangement of components set forth in the following description or illustrated in the drawings. The depicted embodiments are capable of other embodiments and of being practiced or of being carried out in various ways. Each example is provided by way of explanation, not limitation of the disclosed embodiments. In fact, it will be apparent to those skilled in the art that various modifications and variations may be made in the present embodiments without departing from the scope or spirit of the disclosure. For instance, features illustrated or described as part of one embodiment may be used with another embodiment to still yield further embodiments. Thus, it is intended that the present disclosure covers such modifications and variations as come within the scope of the appended claims and their equivalents.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the embodiments of the present invention, and do not create limitations, particularly as to the position, orientation, or use of the embodiments of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Airfoils have certain integrity to foreign object damage from birds, debris, and other items ingested by the engine. However, the ingestion of foreign objects may lead to the release of portions of airfoils and may cause unbalance on the rotor that retains and drives the airfoils. This rotor unbalance may be a prime criterion for engine strut, mount, and bearing construction and weight. Current engines may evaluate and set criterion for this rotor unbalance using two times the fan blade mass, meaning the engine components may be sized and constructed to withstand a rotor unbalance equivalent to the unbalance seen when two fan blades are released around the airfoil inner flowpath. Decreases in this two fan blade unbalance criteria would result in lower weight in support structures, mounts, and bearings. This weight reduction may allow for the aircraft to carry more fuel for longer range or increased robustness by allowing the addition of weight in another area of the engine. By controlling or minimizing the composite airfoil material loss, a reduction in this unbalance criterion and resulting benefits may be possible.

A composite airfoil according to embodiments of the present invention allows for these benefits and is described below in detail. As used in the brief descriptions of the illustrations, this paragraph, and hereafter, the term "airfoil" is understood to include, but is not limited to, a fan blade and a vane and the term "composite" is understood to include, but is not limited to, a reinforced polymer matrix composite, including matrices that are thermoset or thermoplastic and reinforcements that include, but are not limited to, glass, graphite, aramid, or organic fiber of any length, size, or orientation or combination of these reinforcements, and furthermore understood to include, but is not limited to, being manufactured by injection molding, resin transfer molding, prepreg tape layup (hand or automated), pultrusion, or any other suitable method for manufacture of a reinforced polymer matrix composite structure or combination of these manufacturing methods. Additionally, "composite" is understood to include, but is not limited to, a hybrid composite of reinforced polymer matrix composite in combination with metal or combinations of more than one reinforced polymer matrix composite or combinations of more than one metal.

The composite airfoil may include a means for controlling airfoil material loss. Exemplary airfoil material loss control structures may include, but are not limited to, one or more fuse zones that, during impact from a foreign object, control the portion of the airfoil that may be lost or released by failing before the airfoil areas adjacent to the fuse zone. Non-limiting exemplary fuse zones may run chordwise, or along the chord length of the airfoil, or along any portion of the chord length of the airfoil, and may be distributed along the radial length, or span, of the airfoil or any portion of the radial length, or span, of the airfoil. Non-limiting, exemplary radial locations for the fuse zone, as measured radially distal from the root, may include, but are not limited to, from about 50% of span to about 90% of the span, another non-limiting, exemplary radial locations may include from about 65% of the span to about 80% of span, yet another non-limiting, exemplary radial locations may include from about 70% of span to about 75% of span. Additionally, some non-limiting embodiments may have transition zones radially above and below the fuse zone. Non-limiting, exemplary radial sizes of the fuse and transition zones range from about 70% of the span to about 75% of the span, other non-limiting, exemplary radial sizes of the fuse and transition zones range from about 60% to about 80% of the span.

Some composite airfoils may be constructed with radial and chordwise plies. Radial plies may be concentrated in the sectional center or centroid of the airfoil to carry the centrifugal load imparted on the airfoil at operating rotor speeds. Likewise, chordwise plies may be concentrated on the exterior of the section of the airfoil and may be tailored for impact toughness, natural frequencies, and tip rub robustness. One known measurement of the strength of a composite airfoil section is bulk strength, which accounts for variation in the ply orientation (radial or chordwise orientation for example) through the composite thickness. Non-limiting embodiments of the fuse zone may reduce this bulk strength by about 5% to about 10%, another non-limiting of the fuse zone may reduce this bulk strength by about 2% to about 15%. For a given composite airfoil section, this reduction in bulk strength may be accomplished by replacing radial plies with chordwise plies in the fuse zone.

Balancing the aforementioned factors of centrifugal loading, impact toughness, natural frequencies, and tip rub robustness may also require a gradual change from a conventional ply orientation to the orientations of the exemplary embodiments of the fuse zone. A transition zone may provide for this gradual change and, for a given composite airfoil section, this reduction in bulk strength may again be accomplished by replacing radial plies with chordwise plies in the transition zone. Non-limiting embodiments of the transition zone may reduce this bulk strength by about 5% to about 10%, another non-limiting of the transition zone may reduce this bulk strength by about 2% to about 15%.

Any combination of exemplary composite airfoil elements, including, but not limited to fuse zones, transition zones, and conventional ply orientation areas, including all variations in location, material, manufacture, shape, size, sectional properties, and length properties of any exemplary element may be suitable for controlling airfoil material loss.

Referring initially to FIG. 1, a schematic side section view of a ducted fan gas turbine engine 10 is shown including a fan module 12 and a core engine 14, located along an engine axis 32. The fan module 12 includes a fan casing 16 surrounding an array of fan airfoils 18 extending radially distal from and coupled to a rotor 20. The core engine 14 includes a high-pressure compressor 22, a combustor 24, and a high pressure turbine 26. A low pressure turbine 28 drives the fan blade 18. Optionally, a speed reduction device 34 may be coupled between the low pressure turbine 28 and the rotor 20 to reduce the rotational speed of the fan rotor 20 below that of the low pressure turbine 28. The optional speed reduction device 34 could be an epicyclical gearbox of a star or planetary configuration, a compound gearbox, or other arrangement of gearing to achieve a reduction of speed between the low pressure turbine 28 and the rotor 20.

In operation, air enters through the air inlet 30 of the engine 10 and moves through at least one stage of compression where the air pressure may be increased and directed to the combustor 24. The compressed air is mixed with fuel and burned providing the hot combustion gas which exits the combustor 24 toward the high pressure turbine 26 and low pressure turbine 28. At the high pressure turbine 26 and low pressure turbine 28, energy is extracted from the hot combustion gas causing rotation of turbine airfoils which in turn cause rotation about engine axis 32 of the shafts to the high pressure compressor 22 and fan airfoils 18 respectively. With respect to the embodiments described herein, fan blade 18 represent the location of composite airfoil 100 within fan module 12 and ducted fan engine 10.

Figure 2:
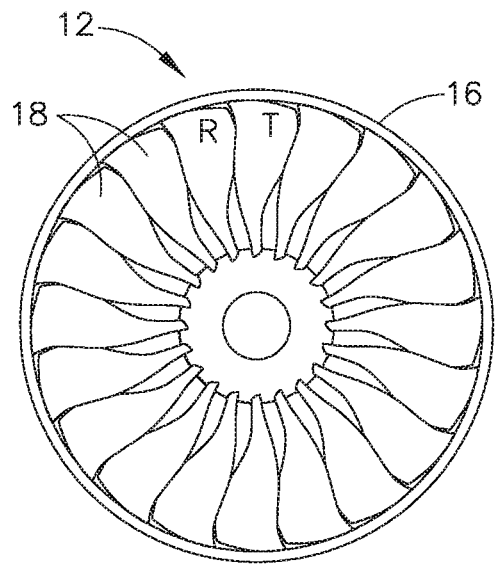
FIGS. 2, 3, 4, and 5 are respective time sequence front views of a ducted fan engine during release of an airfoil portion.
Figure 3:
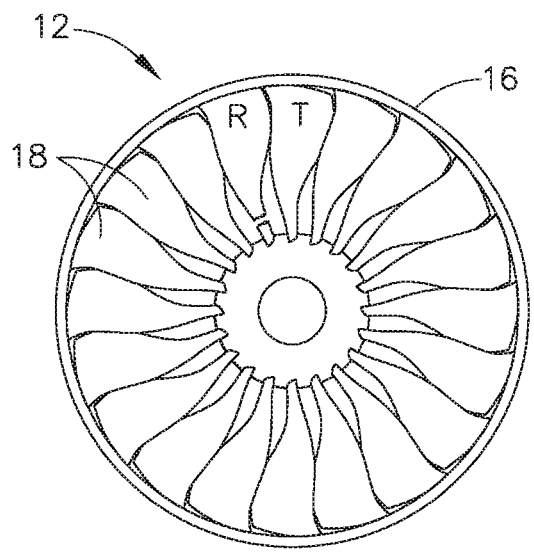
Figure 4:
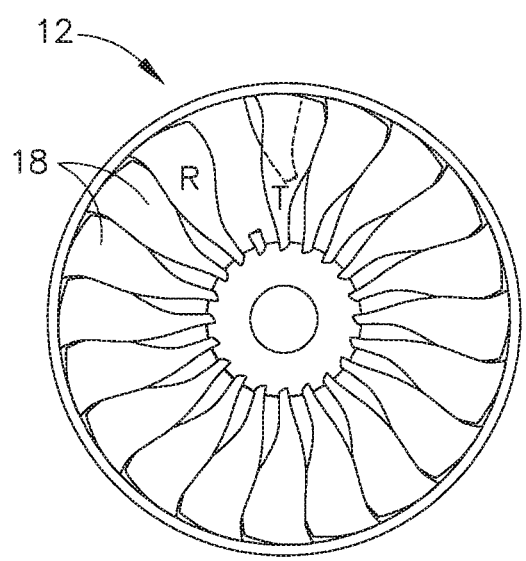
Figure 5:
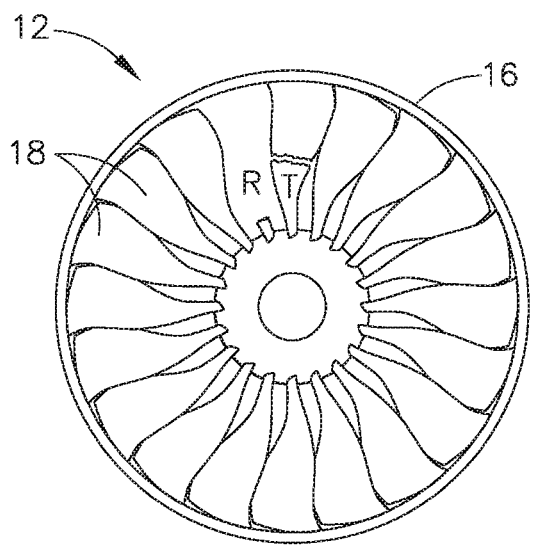

Referring now to FIGS. 2, 3, 4, and 5 which describe time phased depictions of events inside fan module 12 that may unfold after a conventional fan airfoil 18 may be impacted with a foreign object that may cause release of a fan blade 18. This front view of ducted fan engine 10 uses a stage of fan blades 18 and a fan casing 16. Referring again to FIGS. 2, 3, 4, and 5, each show a twenty fan blades 18 and a fan case 16 and represent a time sequence of engine 10 during release of a portion of blade 18. One of the blades 18 in each of FIGS. 2-5 is identified with a letter R, designating it as a release blade and another has been identified with a letter T, designating it as a trailing blade. In FIG. 2, all fan blades 18 are pristine, in that they have not been subject to impact from a foreign object. In FIG. 3, the release blade has been impacted by a foreign object and is separated into two pieces. Moving to FIG. 4, the free portion of the release blade is about impact the trailing blade. Finally, in FIG. 5, the trailing blade is separated into two pieces, caused by the impact of the free portion of the release blade, with the free portion of the release blade removed for clarity. As mentioned above, due to the high rotational speed of the fan blades 18 in engine 10, any decrease in the size of the free portion of the release blade also decreases the unbalance that rotor 20 would experience and ultimately what the rotor support structure (struts, cases, bearings) would carry. Also as mentioned above, the size of released portion may be controlled by introducing an airfoil material loss control structure, a non-limiting example being a fuse zone having reduced bulk strength. This reduced bulk strength may be achieved by modification of the predominate ply layup orientation.

Figure 6:
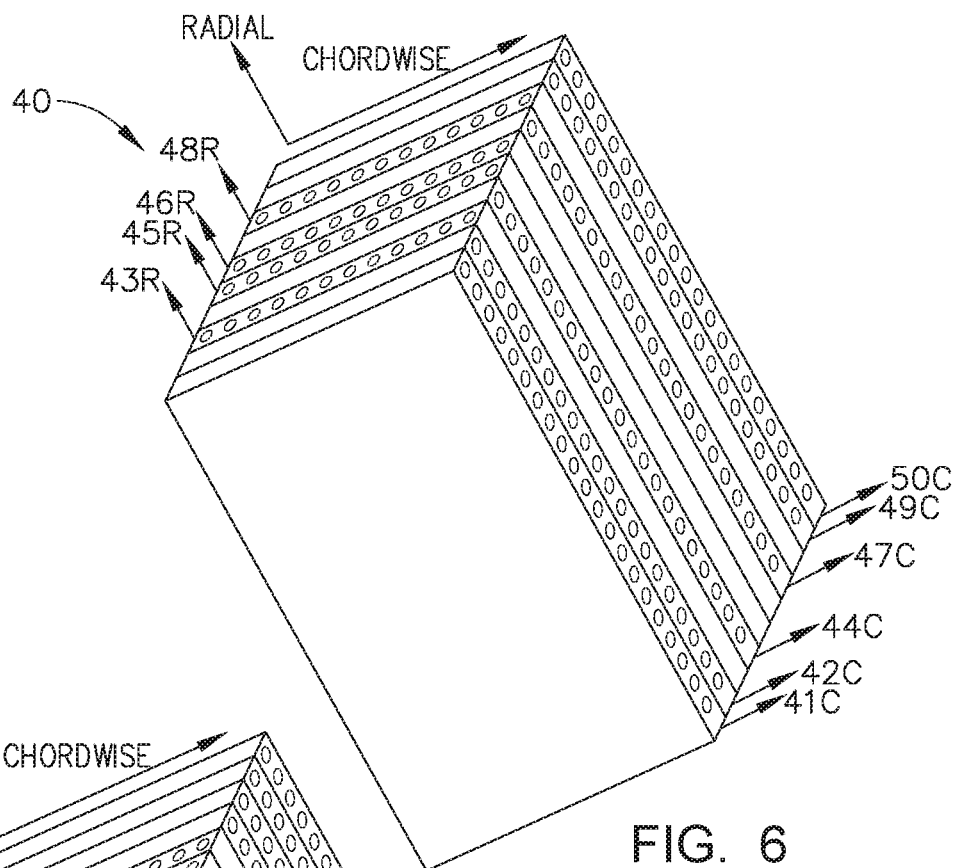
FIG. 6 is a layup orientation of a composite airfoil.
Figure 7:
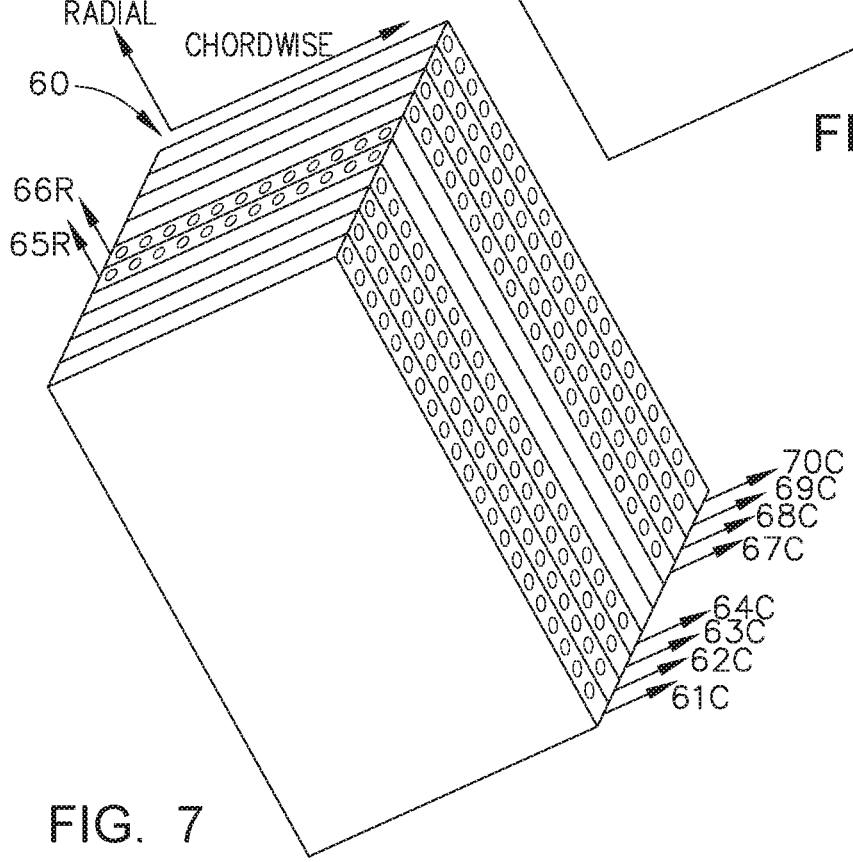
FIG. 7 is an exemplary layup orientation of a composite airfoil.

FIG. 6 depicts an example of a conventional layup orientation 40, with ten plies, numbered 41C, 42C, 43R, 44C, 45R, 46R, 47C, 48R, 49C and 50C. The coordinate axis in FIG. 3 describes the local radial and chordwise direction of the layup with the alpha character of each ply denoting the predominate reinforcement orientation, for example, 45R is a radial ply and 50C is a chordwise ply. This conventional layup orientation 40 has radial plies concentrated in the center of the section, 45R and 46R, with additional radial plies 43R and 48R near the center of the section. Moving to FIG. 7, an a non-limiting, exemplary layup orientation 60, again with ten plies, but now described as 61C, 62C, 63C, 64C, 65R, 66R, 67C, 68C, 69C and 70C. To lower the bulk strength of the section, two radial plies from conventional layup 40, 43R and 48R, were replaced with two chordwise plies 43C and 48C. This replacement weakens the composite in the radial direction as a reduced volume of the composite has reinforcement oriented in the radial direction.

Figure 8:
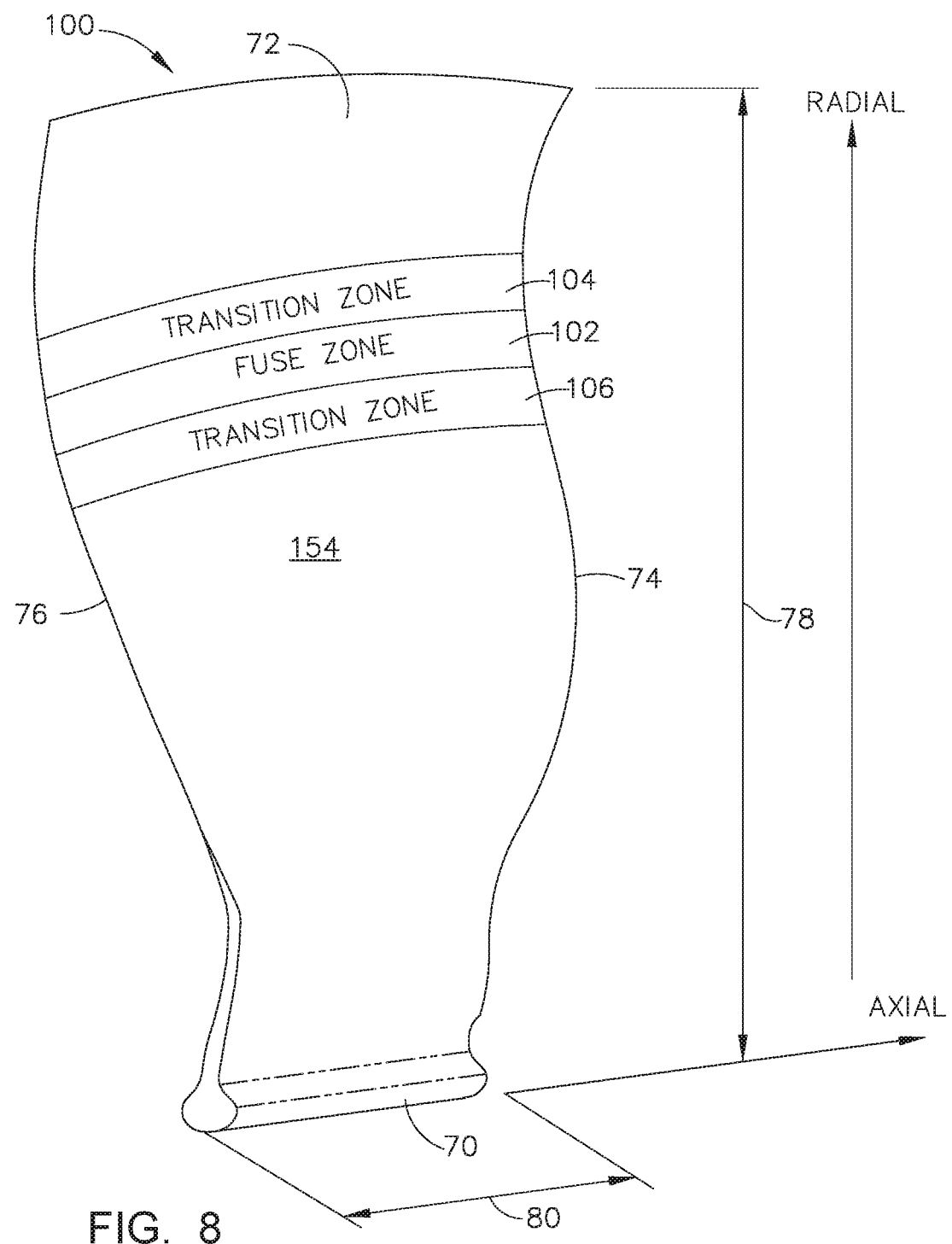
FIG. 8 is an isometric view of an exemplary embodiment of the composite airfoil.

Now considering FIG. 8, an isometric view of an exemplary embodiment of the composite airfoil, having a root 70, a tip 72, a leading edge 74, and a trailing edge 76, with the span 78 of the composite blade 100 distributed radially from root 70 to tip 72, and axial chord 80 distributed aft from leading edge 74 to trailing edge 76. In this exemplary non-limiting embodiment, composite blade 100 has one fuse zone 102 and two optional transition zones 104 and 106. This exemplary, non-limiting, fuse zone 102 may be located around 70% of the span and may be bracketed radially by two transition zones 104 and 106. The radial size of the fuse 102 and each of the optional transition zones 102 and 104 may be at about 5% of the span length.

The aforementioned, non-limiting exemplary embodiments of composite airfoil 100 can be utilized in rotary machines, including, but not limited to, ducted fan, open-rotor, and turboprop gas turbine engines, as well as distributed or remote propulsors, fan modules, and fan systems.

Exemplary, non-limiting composite airfoil 100 counts that may be utilized in rotary machines may range from about 8 airfoils to about 24 airfoils, other exemplary non-limiting composite airfoil 100 counts may range from about 14 airfoils to about 20 airfoils, and an additional exemplary, non-limiting airfoil 100 count may range from about 16 airfoils to about 18 airfoils. Span 78 lengths of these non-limiting exemplary embodiments of composite airfoil 100 may range from about 20 inches to about 90 inches, other exemplary, non-limiting span 78 length may range from about 40 inches to about 70 inches, and additional exemplary, non-limiting span 78 lengths may range from about 50 inches to about 70 inches. Chord 80 lengths of these non-limiting, exemplary embodiments of composite airfoils 100 may range from about 5 inches to about 40 inches, other exemplary, non-limiting chord 80 lengths may range from about 10 inches to about 30 inches, and additional exemplary, non-limiting chord 80 lengths may range from about 12 to about 24 inches.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspect, can be mixed and matched by one of ordinary skill in the art to construct additional embodiments and techniques in accordance with principles of this application.

What is claimed is:

1. A rotary machine, comprising:
   a composite airfoil having a root, a tip, a leading edge, and a trailing edge, a span distributed radially from the root to the tip, a chord distributed from the leading edge to the trailing edge, and a material loss control structure, wherein the material loss control structure is located between about 50% of the span to about 90% of the span.

2. The rotary machine of claim 1, wherein the airfoil material loss control structure is composite.

3. The rotary machine of claim 1, wherein the airfoil material loss control structure is a fuse.

4. The rotary machine of claim 3, wherein the fuse further comprises a fuse zone.

5. The rotary machine of claim 4, wherein the fuse further comprises a transition zone.

6. The rotary machine of claim 4, wherein the composite airfoil is configured to operate in at least one machine selected from the group consisting of a ducted gas turbine engine, an open-rotor gas turbine engine, a turboprop gas turbine engine, a distributed propulsor, a remote propulsor, and a fan module.

7. The rotary machine of 4, further comprising a speed reduction device coupled between a low pressure turbine and a rotor.

8. The rotary machine of 4, further comprising 8 to 24 composite airfoils.

9. A composite airfoil, comprising:
 a root, a tip, a leading edge, a trailing edge;
 a span distributed radially from the root to the tip, and a chord distributed from the leading edge to the trailing edge; and
 a composite fuse, wherein the composite fuse is located between about 50% of the span to about 90% of the span.

10. The composite airfoil of claim 9, wherein the composite fuse further comprises a fuse zone.

11. The composite airfoil of claim 10, wherein the composite fuse further comprises a transition zone.

12. The composite airfoil of claim 10, wherein the fuse zone is distributed along about 5% of the span.

13. The composite airfoil of claim 11, wherein the transition zone is distributed along about 5% of the span.

14. The composite airfoil of claim 11, wherein the transition zone is located radially above or below the fuse zone.

15. The composite airfoil of claim 9, wherein the span is about 20 inches to about 90 inches.

16. The composite airfoil of claim 9, wherein the chord is about 5 inches to about 40 inches.

17. The composite airfoil of claim 9, further comprising a predominate ply layup orientation and a bulk strength, the composite fuse further comprising a reduction in the bulk strength of about 2% to about 15% via modifying the predominate ply layup orientation.

18. The composite airfoil of claim 9, further comprising a predominate ply layup orientation and a bulk strength, the composite fuse further comprising a reduction in the bulk strength of about 2% to about 15% via modifying the predominate ply layup orientation.

* * * * *